(12) United States Patent
Revier et al.

(10) Patent No.: US 10,170,384 B2
(45) Date of Patent: Jan. 1, 2019

(54) METHODS AND APPARATUS PROVIDING A GRADED PACKAGE FOR A SEMICONDUCTOR

(71) Applicant: Texas Instruments Incorporated, Dallas, TX (US)

(72) Inventors: Daniel Lee Revier, Addison, TX (US); Benjamin Stassen Cook, Addison, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/620,361

(22) Filed: Jun. 12, 2017

(65) Prior Publication Data

US 2018/0254230 A1 Sep. 6, 2018

Related U.S. Application Data

(60) Provisional application No. 62/466,385, filed on Mar. 3, 2017.

(51) Int. Cl.
| | | |
|---|---|---|
| *H01L 33/58* | (2010.01) | |
| *H01L 23/29* | (2006.01) | |
| *G06F 17/50* | (2006.01) | |
| *H01L 23/31* | (2006.01) | |
| *H01L 23/552* | (2006.01) | |
| *H01L 21/56* | (2006.01) | |
| *H01L 21/67* | (2006.01) | |

(52) U.S. Cl.
CPC .......... *H01L 23/29* (2013.01); *G06F 17/5068* (2013.01); *H01L 21/56* (2013.01); *H01L 21/67126* (2013.01); *H01L 23/3114* (2013.01); *H01L 23/552* (2013.01); *G06F 2217/12* (2013.01); *G06F 2217/40* (2013.01)

(58) Field of Classification Search
CPC ................................ H01L 33/58; H01L 33/52
See application file for complete search history.

(56) References Cited

U.S. PATENT DOCUMENTS

| | | | |
|---|---|---|---|
| 6,482,576 B1 | 11/2002 | Farnworth et al. | |
| 6,706,374 B2 | 3/2004 | Grigg et al. | |
| 6,939,501 B2 | 9/2005 | Grigg et al. | |
| 2007/0134359 A1 | 6/2007 | Farnworth | |
| 2013/0078411 A1* | 3/2013 | Gaska .................. | C09D 163/00 428/68 |
| 2014/0359372 A1* | 12/2014 | Kim ....................... | G06F 11/26 714/38.1 |

OTHER PUBLICATIONS

International Search Report for PCT/US2018/020936 dated Aug. 2, 2018; 2 pages.

* cited by examiner

*Primary Examiner* — Thomas L Dickey
(74) *Attorney, Agent, or Firm* — Michael A. Davis, Jr.; Charles A. Brill; Frank D. Cimino

(57) ABSTRACT

Methods and apparatus providing a graded package for a semiconductor are disclosed. An example apparatus includes a die; and a graded package encapsulating the die, the graded package including a material that is spatially varied from a first location of the graded package to a second location of the graded package.

11 Claims, 5 Drawing Sheets

METHODS AND APPARATUS PROVIDING A GRADED PACKAGE FOR A SEMICONDUCTOR

RELATED APPLICATION

This patent arises from a patent application claiming the benefit of U.S. Provisional Patent Application Ser. No. 62/466,385, which was filed on Mar. 3, 2017. U.S. Provisional Patent Application Ser. No. 62/466,385 is hereby incorporated herein by reference in its entirety.

FIELD OF THE DISCLOSURE

This disclosure relates generally to semiconductor devices and, more particularly, to methods and apparatus providing a graded package for a semiconductor.

BACKGROUND

When a semiconductor device is manufactured, a wafer of semi-conductive material is generated and processed to create a die with certain characteristics and/or functionalities. The die is mounted, connected to leads, and encased in a package made up of material (e.g., plastic, ceramic, etc.). The package is a supporting case that prevents damage or corrosion of the die.

SUMMARY

Certain examples provide an apparatus with a graded package for a semiconductor. The example apparatus includes a die and a graded package encapsulating the die, the graded package including a material that is spatially varied from a first location of the graded package to a second location of the graded package.

Certain examples provide a method for providing a graded package for a semiconductor. The example method includes developing a package grading design for a graded package encapsulating a die. The example method further includes generating the graded package for the die by spatially varying package material of the graded package based on the package grading design.

Certain examples provide an apparatus to provide a graded package for a semiconductor. The example apparatus includes a package grading designer to develop a package grading design for a graded package encapsulating a die. The example apparatus further includes a printhead controller to generate the graded package for the die by controlling a printhead to spatially varying package material of the graded package based on the package grading design. The example apparatus further includes a package material controller to release the spatially varying package material.

Certain examples provide a computer readable storage medium comprising instructions which, when executed cause a machine to provide a graded package for a semiconductor. The example computer readable medium includes instructions to cause the machine to develop a package grading design for a graded package encapsulating a die and generate the graded package for the die by spatially varying package material of the graded package based on the package grading design.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
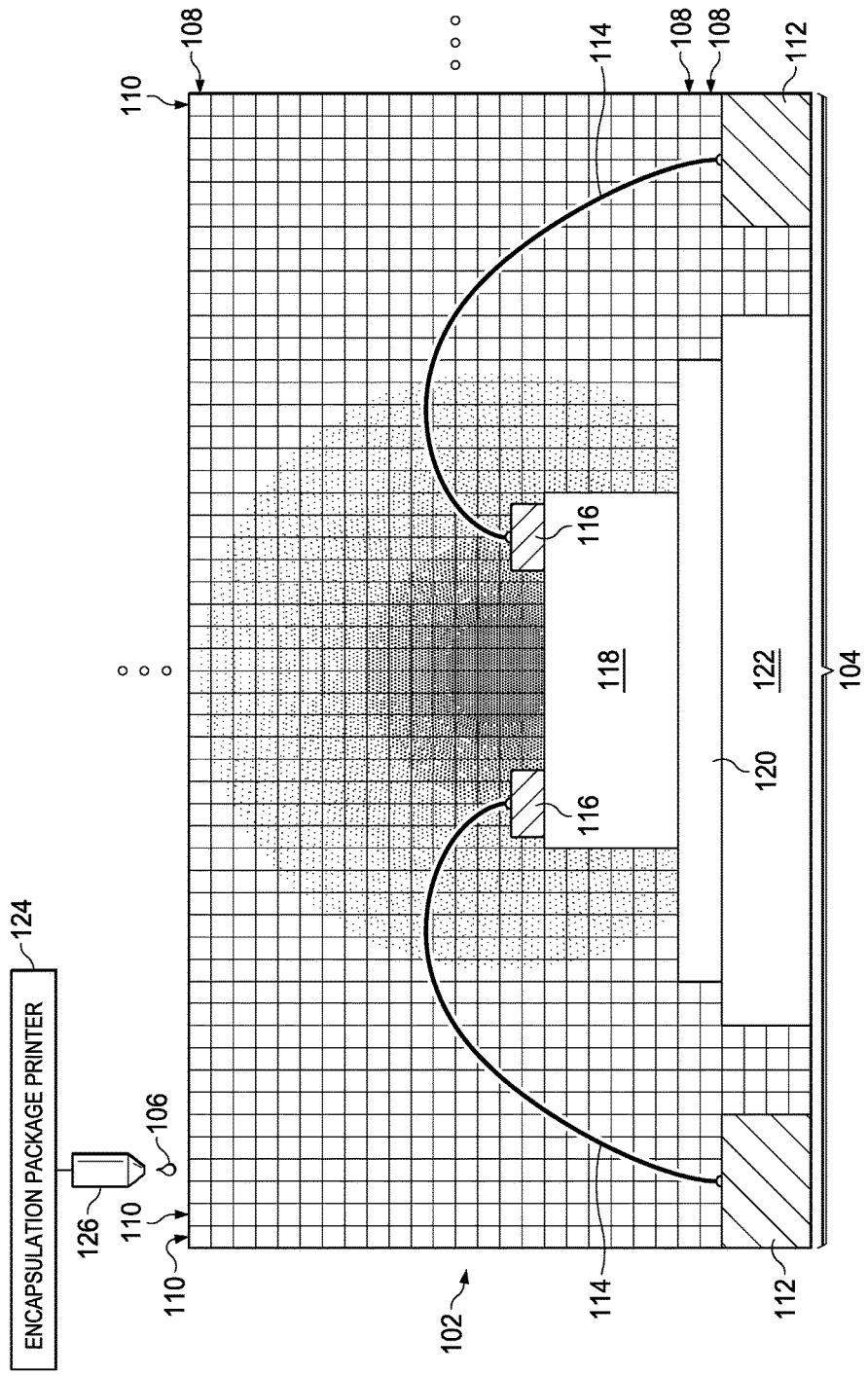
FIG. 1 is an illustration of an example encapsulation package printer to print an example graded package.

Semiconductor devices fabrication techniques create integrated circuits that are used in everyday electrical devices, such as televisions, mobile phones, toys, computers, etc. Some fabrication techniques include generating a die (e.g., a small block of semiconducting material where a functional circuit is fabricated). Once the die is generated, packaging is performed to encapsulate the die with a package (e.g., case) to protect the die from physical damage and corrosion. In some examples, the package supports electrical contacts (e.g., leads) to provide a connection for the die to interface with another device (e.g., a circuit board, wire, trace, etc.).

Conventional semiconductor packages are made from a uniform material (e.g., an epoxy material filled silica particles) to provide sufficient strength to resist physical breakage, and/or provide heat dissipation. In some examples, an end-user may couple a semiconductor device including such conventional packages (e.g., a packaged die) with an additional external device(s). For example, an end-user may couple an external antenna with a conventional packaged die by connecting the external antenna with a trace included in the packaged die. However, such conventional techniques may be difficult to implement by the end user/third party, leading to the end-users mistakenly thinking the packed die is faulty. Additionally, external antenna integration requires additional board space that may be limited. Examples disclosed herein alleviate the problems of such external integration of devices by generating graded packages, where the characteristics of the graded package provide the functionality (e.g., lensing, electromagnetic interference (EMI)/electromagnetic compatibility (EMC) protection, radiation, etc.) of an external device.

Examples disclosed herein include a graded package and techniques for generating the graded package whose material is spatially varied throughout the package to realize some desired characteristic(s). The graded package varies the material properties of the package in three dimensions (e.g., x, y, and z) to generate various properties/characteristics using the package itself. For example, the graded package may include a first ratio of two or more different types of materials at a first location of the package and the ratio may spatially vary throughout the package (e.g., such that there is a second ratio different than the first ratio of the two materials at a second location of the package). In some examples, the package is broken up into voxels, where individual voxels or groups of voxels include different materials and/or combination of materials corresponding to different characteristics. Examples disclosed herein may print or otherwise generate a package using multiple materials and/or multiple combinations of materials to generate a graded package that is spatially varied with varying characteristics corresponding to different functionalities while protecting the die. For example, a graded package may be generated such that the graded package provides lensing, operates as a dielectric resonator antenna (DRA), improves EMI/EMC performance, provides waveguiding, provides cloaking, performs beamsteering, etc.

FIG. 1 illustrates an example graded package 102 of an example semiconductor device 104. FIG. 1 includes the example graded package 102, the example semiconductor device 104, example package material 106, example layers 108, example package voxels 110, example leads 112, example bond wires 114, example bond pads 116, an example die 118, an example die attach material 120, an example die pad 122, an example encapsulation package printer 124, and an example printhead 126.

The example semiconductor device 104 of FIG. 1 includes the example leads 112 coupled to the example bond pads 116 via the example bond wires 114. The example bond pads 116 connect to the example die 118, which is mounted on the example die pad 122 by the example die attach material 120 (e.g., including an epoxy). In the illustrated example of FIG. 1, the example graded package 102 encapsulates (e.g., partially or completely) the example leads 112, the example bond wires 114, the example bond pads 116, the example die 118, the example die attach material 120, and the example die pad 122.

The example graded package 102 of FIG. 1 includes the example package material 106 which is spatially varied to include various materials and/or combination of materials at different locations corresponding to different characteristics. The various materials may include different types of polymers, doped polymers (e.g., doped with nano or micro particles of ceramics, oxides, carbon nanomaterials, such as carbon nanotubes (CNTs); Graphene; or Hexagonal Boron Nitrate, etc.), composite pastes (e.g., binders with particles from dopants), selectively hydrolyzed sol-gels, air, etc., and/or any combination thereof. The materials and/or combination of materials give the graded package 102 different characteristics. Accordingly, the example graded package 102 may be generated to perform functions (e.g., lensing, waveguiding, cloaking, beamsteering, EMI/EMC shielding, operating as an antenna, etc.). In the illustrated example of FIG. 1, the various example layers 108 and/or example voxels 110 represent the dimensions and/or characteristics of the example graded package 102. The example package material 106 and/or combination of materials of the example graded package 102 may vary for each voxel and/or group of voxels in any direction (e.g., the x, y, or z domains) to generate different grading patterns based on a desired functionality. Spatially varying the materials of the example graded package 102 spatially varies, for example, the relative permittivity (e.g., for lensing, radiating, and EMI/EMC improvements) relative permeability, Young's modulus (e.g., to vary the withstanding of tension or stress), etc. of the graded package 102 to correspond to the desired functionality. In some examples, the graded package 102 may be graded to improve the bandwidth and/or efficiency of a graded package corresponding to a dielectric resonator antenna. Example grading designs are described below in conjunction with FIGS. 5A-5D.

The example encapsulation package printer 124 of FIG. 1 prints the example package material 106 to generate the example graded package 102, thereby encapsulating the example die 118. The example encapsulation package printer 124 (A) receives instructions to print the example graded package 102 according to some desired properties and/or functionality and (B) controls the example printhead 126 to print the example graded package 102 according to a developed grading design based on the desired properties or functionality. For example, if the example encapsulation package printer 124 receives instructions to print the graded package 102 as an antenna (e.g., a DRA), the example encapsulation package printer 124 develops a grading design such that the example graded package 102, when printed, corresponds to the desired characteristics (e.g., the dielectric constant(s)) of the antenna. In such an example, the example encapsulation package printer 124 may generate the example graded package 102 using one or more materials to generate a radiating resonator that transforms guided waves into unguided wave (e.g., radio frequency signals) using high permittivity material and/or material combinations. The example graded package 102 can be generated to correspond to a size on an order of $$\frac{\lambda_0}{\sqrt{\epsilon_r}},$$

where $\lambda_0$ is the free-space wavelength at a resonant frequency and $\epsilon_r$ is the relative permittivity of the example package material 106 at a given voxel 110 of the example graded package 102. Generating a graded package 102 corresponding to a DRA may including coupling different Eigen modes that radiate differently for smooth operation of the DRA. The example graded package 102 may be generated to extended the bandwidth and/or efficiency of the DRA.

In some examples, the example encapsulation package printer 124 of FIG. 1 heats one or more package materials 106 to force the one or more package materials 106 through the printhead 126 while moving the printhead 126 in three dimensions, thereby generating the specially varied example graded package 102. The example encapsulation packager printer 124 adjusts which package materials 106 and/or combination of package materials 106 to use while printing according to the developed grading design. In some examples, the encapsulation package printer 124 may be an inkjet style, where the encapsulation package printer 124 prints one or more package materials 106 in each of the example voxels 110. In some examples, the package printer 124 may be an additive style printer to vary the one or more package material(s) 106 while printing in the example layers 108, where each layer is printed in subsequent order. The example encapsulation package printer 124 is further described below in conjunction with FIG. 2.

Figure 2:
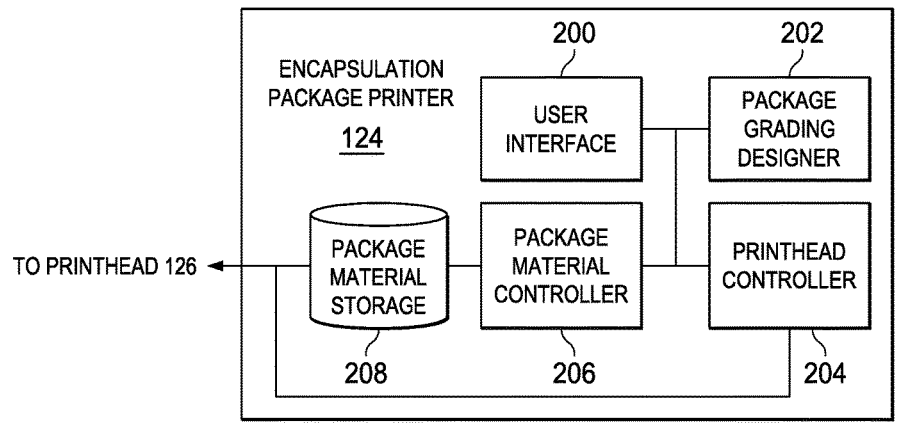
FIG. 2 is an example block diagram of the example encapsulation package printer of FIG. 1.

FIG. 2 is a block diagram of the example encapsulation package printer 124 of FIG. 1 disclosed herein, to generate (e.g., print) the example graded package 102 for the example semiconductor device 104 of FIG. 1. While the example encapsulation package printer 124 is described in conjunction with the example semiconductor device 104 of FIG. 1, the example encapsulation package printer 124 may be utilized to print any type of graded package for any type of semiconductor device. The example encapsulation package printer 124 includes an example user interface 200, an example package graded designer 202, an example printhead controller 204, an example package material controller 206, and an example package material storage 208.

The example user interface 200 of FIG. 2 receives instructions from a user regarding how to grade the example package material 106 in generating the example graded package 102. In some examples, the user provides, via the user interface 200, a design at the voxel/layer level including what combination and/or what material characteristics should be generated (e.g., printed) at each voxel 110. In some examples, the user provides desired characteristic(s) or functionality of the example graded package 102 or selects a predesigned template of the example graded package 102 based on the desired characteristics and/or functionalities.

The example package graded designer 202 of FIG. 2 generates (e.g., designs) package grading designs based on the instructions received via the example user interface 200. The package grading designs include a blueprint for what material(s) and/or amount of material(s) (e.g., a ratio of differing materials) should be printed in each location (e.g., voxel) of the example graded package 102, as well as how to control the example printhead 124 to achieve such a blueprint. For example, if the user interface 200 receives instructions to generate the example graded package 102 to linearly change its dielectric constant from a first value (e.g., corresponding to a first ratio/combination of materials) to a second value (e.g., corresponding to a second ratio/combination of materials) in the z-direction (e.g., as illustrated in FIG. 5B), the example package graded designer 202 generates a package grading design based on such instructions. Additionally or alternatively, the example package grading designer 202 may include grading templates corresponding to different functionalities that may be selected/desired by a user (e.g., the example user interface 200).

The example printhead controller 204 of FIG. 2 controls the position of the example printhead 126 while printing the example graded package 102 according to the design of the example package graded designer 202 and/or provided via the example user interface 200. In some examples, the printhead controller 204 begins at a first layer (e.g., corresponding to a first one of the example layers 108 of FIG. 1) and controls the example printhead 126 to move to each location of the layer according to the package grading design while continuously releasing the example package material 106 (e.g., while the example package material controller 206 spatially varies the example package material 106). In such examples, when the layer is complete, the printhead moves to a subsequent layer and the process is repeated until all layers of the example graded package 102 are printed. In some examples, the printhead controller 204 controls the example printhead 126 to move to a voxel location (e.g., one of the example voxels 110) to print the example package material 106 in the voxel (e.g., for an inkjet style printing) and once printed moves to a different voxel location.

Figure 6:
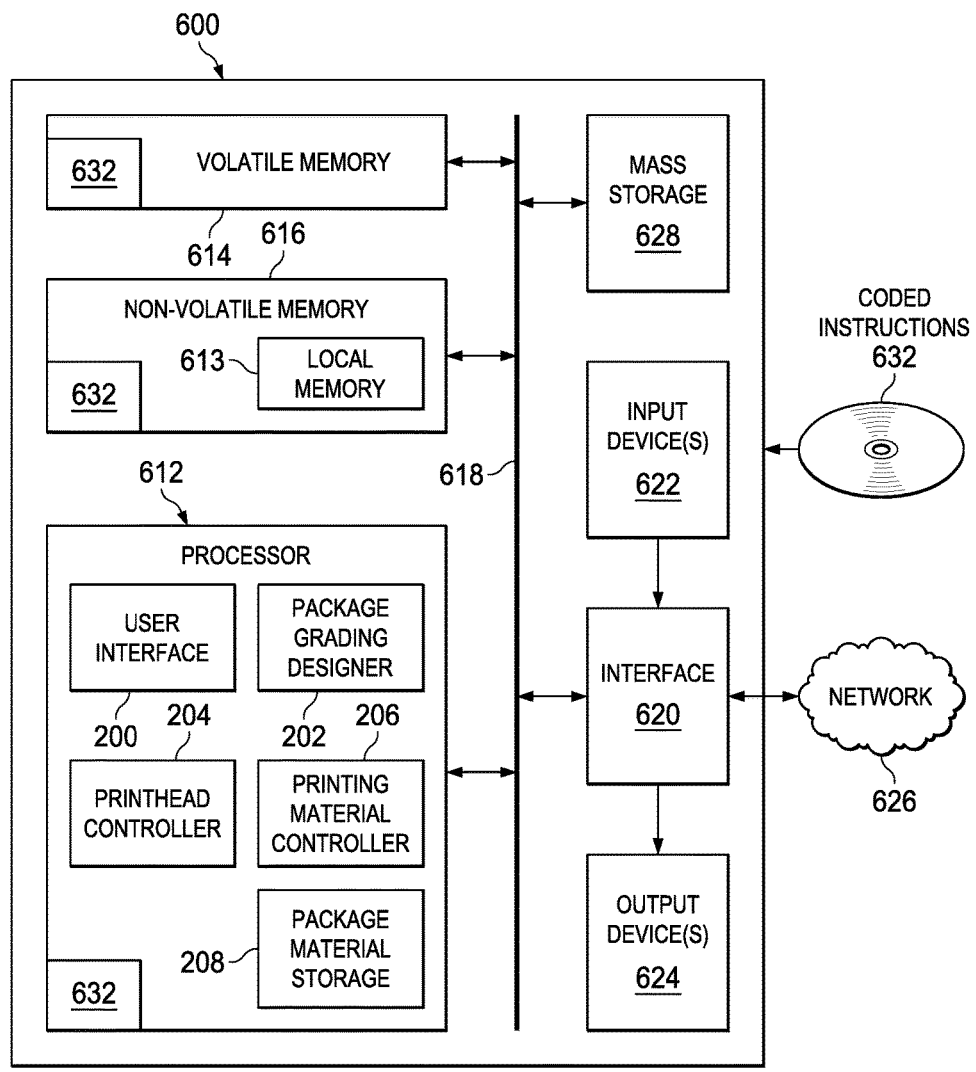
FIG. 6 is a block diagram of a processor platform structured to execute the example machine readable instructions of FIG. 6 to control the example encapsulation package printer of FIG. 1.

The example package material controller 206 of FIG. 6 controls what material and/or combination of materials is included in the example package material 106 of FIG. 1 at each location of the example graded package 102 according to the package grading design. The example package material controller 206 applies a signal to the example package material storage 208 to release one or more of the materials stored in the example package material storage 208. The example package material storage 208 may include multiple storage units to contain multiple different material types (e.g., polymers, doped polymers, composite pastes, selectively hydrolyzed sol-gels, air, and/or any combination thereof). In some examples, the package material controller 206 may transmit a signal to the example package material storage 208 to increase the temperature of one or more materials, thereby reducing the viscosity of the one or more materials. Reducing the viscosity of the one or more materials causes the one or more materials to flow out of the example printhead 126. In some examples, the package material controller 206 may transmit a signal to the example package material storage 208 to open one or more valves, thereby allowing one or more of the materials to flow out of the example printhead 126. In some examples, the package material controller 206 controls the printhead 126 to output one or more drops of the material combination at a time (e.g., for inkjet operation) and/or output a continuous flow of materials that changes with position of the example printhead 126.

While an example manner of implementing the encapsulation package printer 124 of FIG. 1 is illustrated in FIG. 2, one or more of the elements, processes and/or devices illustrated in FIG. 2 may be combined, divided, re-arranged, omitted, eliminated and/or implemented in any other way. Further, the example user interface 200, the example package grading designer 202, the example printhead controller 204, the example package material controller 206, the example package material storage 208, and/or more generally the example encapsulation package printer 124 of FIG. 2 may be implemented by hardware, software, firmware and/or any combination of hardware, software and/or firmware. Thus, for example, any of the example user interface 200, the example package grading designer 202, the example printhead controller 204, the example package material controller 206, the example package material storage 208, and/or more generally the example encapsulation package printer 124 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 200, the example package grading designer 202, the example printhead controller 204, the example package material controller 206, the example package material storage 208, and/or more generally the example encapsulation package printer 124 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example encapsulation package printer 124 of FIG. 2 may include one or more elements, processes and/or devices in addition to, or instead of, those illustrated in FIG. 2, and/or may include more than one of any or all of the illustrated elements, processes and devices.

Figure 3:
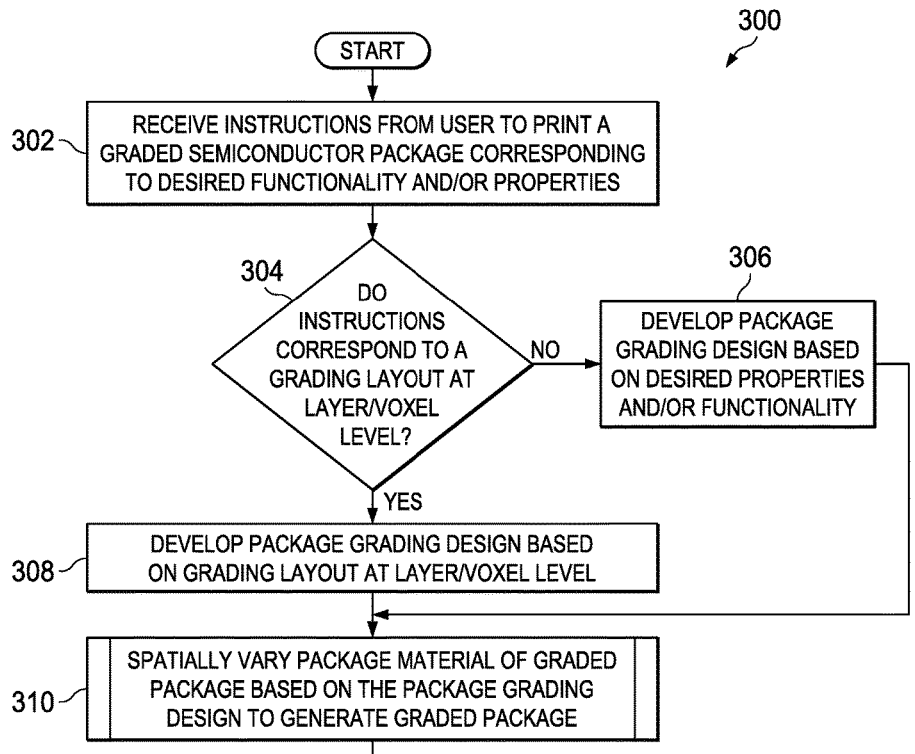
FIGS. 3-4 are flowcharts representative of example machine readable instructions that may be executed to implement the example encapsulation printer of FIG. 1 to print the example graded package of FIG. 1.
Figure 4:
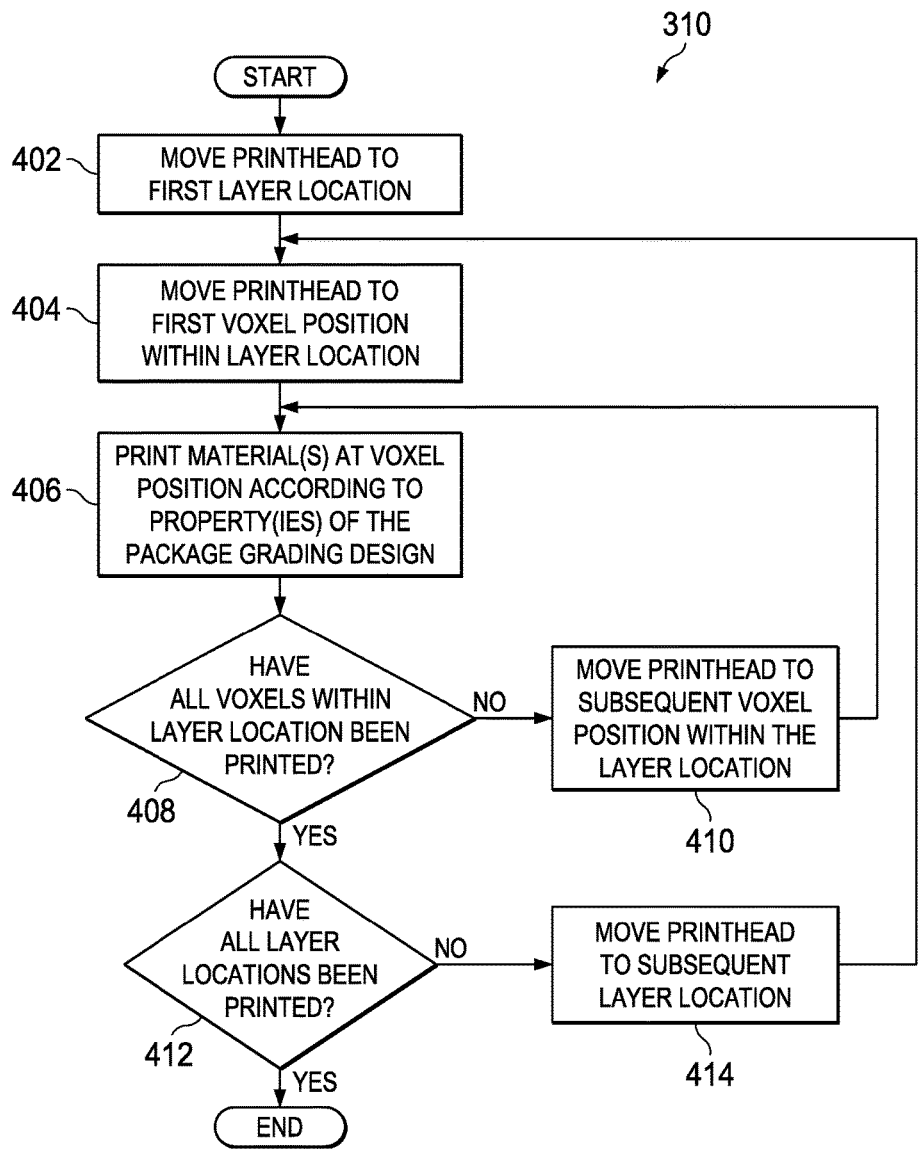

Flowcharts representative of example machine readable instructions for implementing the encapsulation package printer 124 of FIG. 2 is shown in FIGS. 3-4. In this example, the machine readable instructions comprise a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-4, many other methods of implementing the example encapsulation package printer 124 may alternatively be used. For example, the order of execution of the blocks may be changed, and/or some of the blocks described may be changed, eliminated, or combined.

Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 3 is an example flowchart 300 representative of example machine readable instructions that may be executed by the example encapsulation package printer 124 of FIG. 1 to generate the example graded package 102 of FIG. 1. Although the instructions of FIG. 3 are described in conjunction with the example encapsulation package printer 124 and the example semiconductor device 104 of FIG. 1, the example instructions may be utilized by any type of encapsulation package printer and/or semiconductor device.

At block 302, the example user interface 200 receives instructions from a user to print a graded semiconductor package corresponding to a desired functionality and/or properties. At block 304, the example package graded designer 202 determines if the instructions correspond to a grading layout at the layer/voxel level. In some examples, a user may generate a graded package layout by selecting a desired material and/or characteristic at each voxel (e.g., each of the example voxels 110 of FIG. 1). In such an example, the package graded designer 202 determines that the instructions corresponding to a grading layout at the layer/voxel level. In other examples, the user may provide instructs corresponding to an overall structure or overall desired functionality (e.g., a DRA operating at 2.4 gigahertz (GHz)) of the example graded package 102. In such examples, the package graded designer 202 determines that the instructions do not correspond to a grading layout at the layer/voxel level and the example package graded designer 202 is to generate a package grading layout based on the desired structure and/or functionality.

If the example package graded designer 202 determines that the instructions do not correspond to a grading layout at the layer/voxel level (block 304: NO), the example package graded designer 202 develops a package grading design based on the desired properties and/or functionality (block 306). If the example package graded designer 202 determines that the instructions correspond to a grading layout at the layer/voxel level (block 304: YES), the example package graded designer 202 develops a package grading design based on the grading layout at the layer/voxel level generate by the user (block 308). In some examples, the example package grading design may include how to control the example printhead 126 to generate the example graded package 102 based on the grading layout and/or the desired property(ies) and/or functionality(ies).

At block 310, the example printhead controller 204 and/or the example package material controller 206 spatially varies the example package material 106 of the example graded package 102 based on the package grading design to generate the example graded package 102. As described above, the example package material controller 206 spatially varies the example package material 106 by outputting different materials and/or combination of materials stored in the example package material storage 208 as the example printhead controller 204 moves the example printhead 126 to various voxel locations. An example of block 310 is further described below in conjunction with FIG. 4.

FIG. 4 is an example flowchart 310 representative of example machine readable instructions that may be executed to implement the example encapsulation package printer 124 of FIG. 1 to spatially vary the example package material 106 of the example graded package 102 based on the package grading design to generate the example graded package 102 of FIG. 1, as previously described at block 310 of FIG. 3. Although the instructions of FIG. 4 are described in conjunction with the example encapsulation package printer 124 and the example semiconductor device 104 of FIG. 1, the example instructions may be utilized by any type of encapsulation package printer and/or semiconductor device.

At block 402, the example printhead controller 204 moves the example printhead 126 to a first layer location (e.g., a first layer of the example layers 108 of FIG. 1). At block 404, the example printhead controller 204 moves the printhead to a first voxel position within the first layer location (e.g., a first one of the example voxels 110 within a first one of the example layers 108 of FIG. 1). At block 406, the example package material controller 206 prints one or more materials at the voxel position according to the property(ies) of the package grading design. For example, the example package material controller 206 may transmit a signal to the example package material storage 208 of FIG. 2 to release one or more materials. As described above, such materials may include different types of polymers, doped polymers (e.g., doped with nano or micro particles of ceramics, oxides, carbon nanomaterials, such as CNTs; Graphene; or Hexagonal Boron Nitrate, etc.), composite pastes (e.g., binders with particles from dopants), selectively hydrolyzed sol-gels, air, etc., and/or any combination thereof.

At block 408, the example printhead controller 204 determines if all the voxels within the layer location have been printed. If the example printhead controller 204 determines that all of the voxels within the layer location have not been printed (block 408: NO), the example printhead controller 204 moves the printhead 126 to a subsequent voxel position within the layer location (block 410) and the process returns to block 406 until the voxels of the layer location have been printed according to property(ies) of the package grading design. As described above, each voxel may have a different material and/or a different combination of materials that is printed as the printhead 126 moves within the layer, thereby resulting in a spatially varied package within each of the example layers 108.

If the example printhead controller 204 determines that all of the voxels within the layer location have been printed (block 408: YES), the example printhead controller 204 determines if all the layer locations have been printed (block 412). If the example printhead controller 204 determines that all of the layer locations have not been printed (block 412: NO), the example printhead controller 204 moves the printhead to a subsequent layer location (e.g., a second layer of the example layers 108 of FIG. 1) (block 414) and the process returns to block 404 to print one or more materials the at one or more of the example voxels of the subsequent layer. In this manner, the process continues until the example graded package 102 is complete. If the example printhead controller 204 determines that all of the layer locations have been printed (block 412: YES), the process ends. As explained above, the end result is the example graded package 102 that includes spatially varied package material in the x, y, and/or z direction to realize different characteristics and/or functionalities.

FIGS. 5A-5D illustrate example grading patterns that may be implemented in the example graded package 102 and/or printed by the example encapsulation package printer 124 of FIG. 1. FIGS. 5A-5D include a side view and a top-down view of an example radial graded package 500, an example linear graded package 502, an example array graded package 504, and an example triangular graded package 506, that may be realized in the example die 118 of the example semiconductor device 104 of FIG. 1. Although the illustrated examples of FIGS. 5A-5D include four example grading patterns, any number and/or types of grading patterns may be realized by the example encapsulation package printer 124 and/or incorporated in the example semiconductor device 104.

Figure 5A:
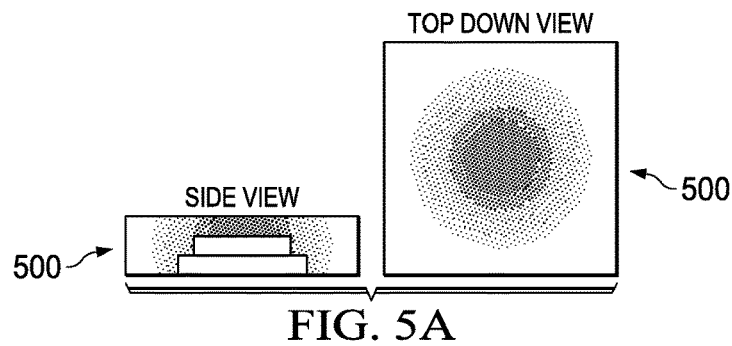
FIGS. 5A-5D illustrate example grading patterns of the example graded package of FIG. 1.
Figure 5B:
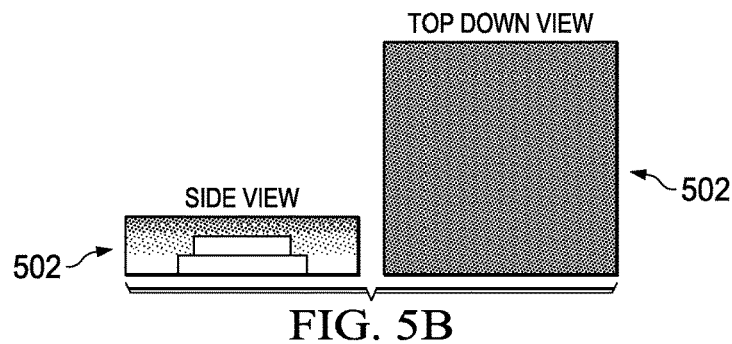
Figure 5C:
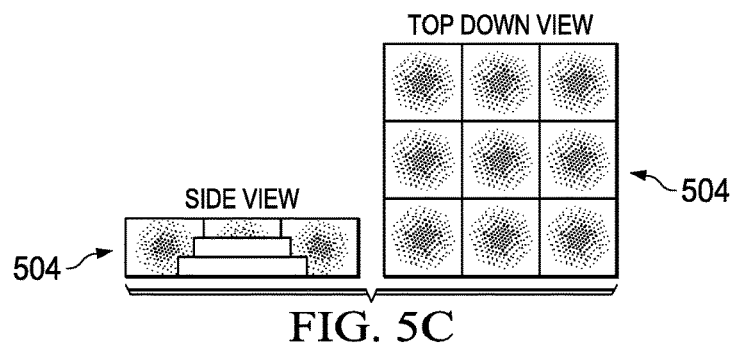
Figure 5D:
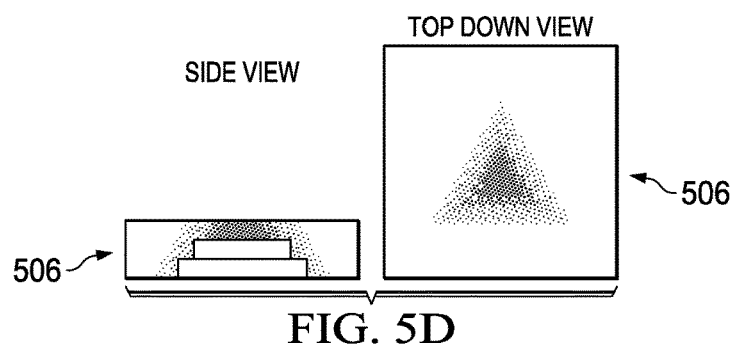

FIG. 5A illustrates the example radial graded package 500. In the example radial graded package 500, the package material (e.g., the combination of materials in the example package material 106) spatially varies in the x-domain, and y-domain. FIG. 5B illustrates the example linear graded package 502. In the example linear graded package 502, the package material (e.g., the combination of materials in the example package material 106) spatially varies in the z-domain. FIG. 5C illustrates the example array graded package 504. In the example array graded package 504, the package material (e.g., the combination of materials in the example package material 106) spatially varies in 9 sections corresponding to a 3×3 array. The number of sections and/or dimension of the arrays may be different based on user and/or manufacturer preferences. Each section of the example array graded package 504 includes package material that spatially varies in the z-domain, y-domain, and z-domain. Additionally or alternatively, each of the example sections of the example array graded package 504 may include a different style of grading. FIG. 5D illustrates the example triangular graded package 506. In the example triangular graded package 506, the package material (e.g., the combination of materials in the example package material 106) spatially varies in the x-domain, y-domain, and the z-domain, resulting in a triangular shaped grading.

FIG. 6 is a block diagram of an example processor platform 600 capable of executing the instructions of FIGS. 3-4 to implement the example encapsulation package printer 124 of FIG. 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor implements the example user interface 200, the example package grading designer 202, the example printhead controller 204, the example package material controller 206, and/or the example package material storage 208.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-4 may be stored in the mass storage device 628, in the volatile memory 614, in the non-volatile memory 616, and/or on a removable tangible computer readable storage medium such as a CD or DVD.

From the foregoing, it will be appreciated that example methods, apparatus and articles of manufacture have been disclosed that provide a graded package for a semiconductor. Conventional semiconductor packages utilize a uniform material to protect the die from damage and provide some heat dissipation. Examples disclosed herein describe a graded package that is graded (e.g., whose material is spatially varied throughout the package), thereby allowing the graded package to perform additional functions that conventional packages are not capable of. For example, graded packages include characteristics/functionality that allow the graded package to operate as an antenna, a waveguider, a lens, a cloak, a beamsteerer, etc. In this manner, additional devices that perform such functions do not need to be coupled to a semiconductor package, thereby saving integrated circuit space and cost.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A method comprising:
generating a graded package for encapsulating a die by spatially varying package material of the graded package based on a package grading design, wherein the generating of the graded package includes:
moving a printhead to a first location of the graded package;
printing at least one of a first material or a first combination of materials at the first location;
moving the printhead to a second location of the graded package; and
printing at least one of a second material or a second combination of materials at the second location, the second material being different from the first material and the second combination being different than the first combination.

2. The method of claim 1, wherein the package grading design includes a blueprint for generating the graded package corresponding to a function.

3. The method of claim 2, wherein the function includes at least one of lensing, radiating, electromagnetic shielding, waveguiding, cloaking, or beamsteering.

4. An apparatus comprising:
a printhead controller to generate a graded package for encapsulating a die by controlling a printhead to spatially vary package material of the graded package based on a package grading design; and
a package material controller to release the spatially varying package material.

5. The apparatus of claim 4, wherein the package grading design includes a blueprint for generating the graded package corresponding to a function.

6. The apparatus of claim 5, wherein the function includes at least one of lensing, radiating, electromagnetic shielding, waveguiding, cloaking, or beamsteering.

7. The apparatus of claim 4, wherein:
the printhead controller is to move the printhead to a first location of the graded package;
the package material controller is to print at least one of a first material or a first combination of materials at the first location;
the printhead controller is to move the printhead to a second location of the graded package; and
the package material controller is to print at least one of a second material or a second combination of materials at the second location, the second material being different from the first material and the second combination being different than the first combination.

8. The apparatus of claim 4, further including a user interface to receive instructions corresponding to the package grading design.

9. A tangible non-transitory computer readable storage medium comprising instructions which, when executed, cause a machine to at least:
generate a graded package for encapsulating a die by spatially varying package material of the graded package based on a package grading design;
move a printhead to a first location of the graded package;
print at least one of a first material or a first combination of materials at the first location;
move the printhead to a second location of the graded package; and
print at least one of a second material or a second combination of materials at the second location, the second material being different from the first material and the second combination being different than the first combination.

10. The computer readable medium of claim 9, wherein the package grading design includes a blueprint for generating the graded package corresponding to a function.

11. The computer readable medium of claim 10, wherein the function includes at least one of lensing, radiating, electromagnetic shielding, waveguiding, cloaking, or beamsteering.

* * * * *